US009656105B2

(12) United States Patent
Umlauft et al.

(10) Patent No.: US 9,656,105 B2
(45) Date of Patent: May 23, 2017

(54) PASSENGER SERVICE MODULE AND PASSENGER SERVICE SYSTEM

(71) Applicant: AIRBUS OPERATIONS GMBH, Hamburg (DE)

(72) Inventors: Sebastian Umlauft, Hamburg (DE); Tobias Ameling, Falkenberg (DE); Robert Thomas, Heilbronn (DE)

(73) Assignee: Airbus Operations GmbH, Hamburg (DE)

( * ) Notice: Subject to any disclaimer, the term of this patent is extended or adjusted under 35 U.S.C. 154(b) by 1008 days.

(21) Appl. No.: 13/659,134

(22) Filed: Oct. 24, 2012

(65) Prior Publication Data

US 2013/0118493 A1 May 16, 2013

Related U.S. Application Data

(60) Provisional application No. 61/550,945, filed on Oct. 25, 2011.

(30) Foreign Application Priority Data

Oct. 25, 2011 (DE) .................. 10 2011 116 884

(51) Int. Cl.
*A62B 7/00* (2006.01)
*B64D 13/06* (2006.01)
*B64D 11/00* (2006.01)
*B64D 13/00* (2006.01)

(52) U.S. Cl.
CPC ............... *A62B 7/00* (2013.01); *B64D 11/00* (2013.01); *B64D 13/06* (2013.01); *B64D 2011/0053* (2013.01); *B64D 2013/003* (2013.01); *Y02T 50/46* (2013.01)

(58) Field of Classification Search
CPC .......... A62B 7/00; B64D 11/00; B64D 13/06; B64D 2011/0053
USPC ..................................... 454/71, 76
See application file for complete search history.

(56) References Cited

U.S. PATENT DOCUMENTS

| 5,556,332 A | * | 9/1996 | Schumacher | .......... B64D 11/00 454/64 |
| 5,803,062 A | * | 9/1998 | Aulgur | .................. B64D 11/00 128/202.26 |
| 5,816,244 A | * | 10/1998 | Aulgur | .................. B64D 11/00 128/202.26 |
| 6,237,994 B1 | * | 5/2001 | Bentley | .................. A47C 1/023 297/118 |

(Continued)

FOREIGN PATENT DOCUMENTS

DE 10 2008 058 271 5/2010
DE 10 2009 014 599 9/2010

(Continued)

*Primary Examiner* — Alissa Tompkins
*Assistant Examiner* — Frances F Hamilton
(74) *Attorney, Agent, or Firm* — Nixon & Vanderhye P.C.

(57) ABSTRACT

A passenger service module including a fitting element, an individual ventilation arrangement connected to the fitting element and having at least one air nozzle, a lighting arrangement connected to the fitting element and having at least one reading lamp, and an operating element connected to the fitting element. The operating element includes a touch panel having at least one input field for individually controlling the operation of the air nozzle and/or of the reading lamp.

16 Claims, 5 Drawing Sheets

(56) References Cited

U.S. PATENT DOCUMENTS

| | | | | |
|---|---|---|---|---|
| 6,848,653 | B2* | 2/2005 | Finke | B64D 11/0015 244/118.5 |
| 8,474,755 | B2* | 7/2013 | Schneider | B64D 11/00 244/118.5 |
| 8,957,791 | B2* | 2/2015 | Macrae | G08C 17/00 340/953 |
| 2009/0295223 | A1* | 12/2009 | Bauer | B60R 16/027 307/9.1 |
| 2010/0096919 | A1* | 4/2010 | Meckes | B60Q 3/0206 307/9.1 |
| 2011/0147520 | A1* | 6/2011 | Schneider | B64D 11/00 244/118.5 |
| 2011/0162015 | A1* | 6/2011 | Holyoake | H04N 7/18 725/76 |
| 2011/0240796 | A1* | 10/2011 | Schneider | B64D 11/00 244/118.5 |
| 2012/0012707 | A1* | 1/2012 | Schliwa | B64D 11/003 244/118.5 |
| 2012/0032027 | A1* | 2/2012 | Gehm | B64D 11/00 244/118.5 |
| 2013/0074115 | A1* | 3/2013 | Hyde | H04N 21/4424 725/30 |
| 2013/0314257 | A1* | 11/2013 | Macrae | G08C 17/00 340/971 |

FOREIGN PATENT DOCUMENTS

| | | | | |
|---|---|---|---|---|
| DE | 10 2009 018 111 | | 10/2010 | |
| DE | WO 2010122017 A3 * | 4/2011 | | B64D 11/00 |
| DE | 10 2009 058 849 | | 6/2011 | |
| DE | 10 2010 018 569 | | 11/2011 | |
| DE | 10 2011 013 368 | | 9/2012 | |
| GB | WO 2011141702 A1 * | 11/2011 | | G08C 17/00 |

* cited by examiner

PASSENGER SERVICE MODULE AND PASSENGER SERVICE SYSTEM

RELATED APPLICATIONS

This application claims priority to German Patent Application No. 10 2011 116 884.6 filed Oct. 25, 2011, and claims the benefit to U.S. Provisional Application No. 61/550,945 filed Oct. 25, 2011, the entire contents of each of which are hereby incorporated by reference.

BACKGROUND OF INVENTION

The invention relates to a passenger service module provided in particular for installation in an aircraft passenger cabin, and to a passenger service system equipped with such a passenger service module.

The passenger cabin of a modern commercial aircraft is conventionally equipped with a large number of personal service units (PSUs) which are each associated with a passenger seat row and are arranged beneath overhead luggage compartments in a position that is accessible to the passengers seated in the passenger seats. A typical PSU, as is described, for example, in DE 10 2009 058 849 A1, comprises a loudspeaker, a display element on which a fasten seatbelt sign, for example, is shown, and one or more reading lamp(s). An individually adjustable air nozzle for each passenger seat in a seat row is further integrated into a conventional PSU. The air nozzle is connected to an individual ventilation system which is conventionally formed separately from a centrally controlled cabin ventilation system. In order to regulate the air flow supplied to the passenger cabin by way of the air nozzle, a passenger can adjust an air outlet cross-section of the air nozzle as desired, for example by rotation of a corresponding diaphragm element.

It is further known from the non-prepublished DE 10 2010 018 569 to integrate modules of an individual ventilation system, which modules comprise components of a centrally controlled cabin ventilation system, components of an emergency oxygen supply system and in each case a plurality of air nozzles, into a carrier structure which is arranged beneath the overhead luggage compartments above the seat rows and extends substantially parallel to a longitudinal axis of the aircraft passenger cabin.

SUMMARY OF INVENTION

The invention is directed at the object of providing a passenger service module which is simple and flexible to fit and convenient to operate, as well as a passenger service system equipped with such a passenger service module.

The object is achieved by a passenger service module having the features of claim 1 and by a passenger service system having the features of claim 10.

A passenger service module according to the invention comprises a fitting element which serves to secure the passenger service module in its fitted position in a vehicle, in particular in an aircraft. Connected to the fitting element is an individual ventilation arrangement, which comprises at least one air nozzle. If desired, the individual ventilation arrangement of the passenger service module may be equipped with a plurality of air nozzles, one air nozzle preferably being provided for each seat of a passenger seat row, which is provided with service functions by the passenger service module. Also connected to the fitting element is a lighting arrangement, which comprises at least one reading lamp. If desired, the lighting arrangement may also be equipped with a plurality of reading lamps, one reading lamp preferably being provided for each seat of a passenger seat row, which is provided with service functions by the passenger service module.

Finally, the passenger service module comprises an operating element connected to the fitting element. The operating element comprises a touch panel having at least one input field for individually controlling the operation of the air nozzle and/or of the reading lamp. If the individual ventilation arrangement comprises a plurality of air nozzles, the touch panel is preferably also provided with a plurality of input fields for individually controlling the operation of the air nozzles. Similarly, the touch panel may have a plurality of input fields for individually controlling the operation of a plurality of reading lamps of the lighting arrangement. Finally, an embodiment of the touch panel with a plurality of input fields that are each associated with an air nozzle or with a reading lamp is also conceivable, that is to say the touch panel may be provided with input fields for individually controlling the operation of air nozzles and of reading lamps.

Owing to its modular form, the passenger service module may be preassembled to form an independently manageable component assembly even before its final fitting in a vehicle, in particular in an aircraft. Final fitting of the passenger service module is therefore particularly simple, time-saving and accordingly inexpensive. In addition, the passenger service module is particularly simple and convenient to operate by way of the touch panel of the operating element.

The individual ventilation arrangement may be arranged in a housing connected to the fitting element. Alternatively, the lighting arrangement may also be arranged in a housing connected to the fitting element. Finally, it is conceivable to equip the passenger service module with a common housing for accommodating the individual ventilation arrangement and the lighting arrangement. The housing may be, for example, square or trapezoidal in shape, but may also have any other desired shape.

In a preferred embodiment of the passenger service module, the housing comprises a releasably secured cover plate. The cover plate may close the housing preferably in the region of a surface of the housing that faces the fitting element, that is to say may form a surface of the housing that faces the fitting element.

The fitting element may comprise an individual air duct section which may be connected to an individual air supply line of an individual ventilation system. The fitting element may further be provided with a carrier section for connecting the fitting element to the individual ventilation arrangement, to the lighting arrangement and/or to the operating element. The carrier section of the fitting element may have a plate-like basic shape, for example, it being possible for the carrier section, if desired, to be provided with cut-outs in order to reduce the weight of the fitting element. The individual air duct section may be in the form of a tube section, for example, and extend in a plane that is substantially perpendicular to a plane defining the carrier section of the fitting element. The individual air duct section and the carrier section of the fitting element are preferably integral.

A first end of the individual air duct section of the fitting element may be connected to the individual ventilation arrangement by way of a flexible connecting element. The flexible connecting element may be formed, for example, by a flexible hose or the like and enables component and fitting tolerances to be compensated. The flexible form of the connecting element further ensures a secure connection between the first end of the individual air duct section and the individual ventilation arrangement even when vibrations occur during operation of the passenger service module. In particular, the flexible connecting element may connect the first end of the individual air duct section of the fitting element to an opening that is formed in the cover plate of the housing accommodating the individual ventilation arrangement and/or the lighting arrangement.

A second end of the individual air duct section of the fitting element is preferably connected to a first end of a flexible individual air connecting line. A second end of the flexible individual air connecting line may be connectable to an individual air supply line of an individual ventilation system. The flexible form of the individual air connecting line again enables component and fitting tolerances to be compensated and ensures a secure connection of the individual air duct section to the individual air supply line of the individual ventilation system if vibrations should occur during operation of the passenger service module.

On the carrier section of the fitting element there may be provided at least one first connecting element for connecting the fitting element to the housing accommodating the individual ventilation arrangement and/or the lighting arrangement. The first connecting element is preferably integral with the carrier section of the fitting element. For example, the first connecting element may be connected to the carrier section in the region of a side face of the carrier section and may extend substantially perpendicularly to the carrier section. Preferably, two first connecting elements are present, which are connected to the carrier section in the region of two opposing side faces of the carrier section. Each first connecting element may be connected to a holding element, which is attached to the housing accommodating the individual ventilation arrangement and/or the lighting arrangement.

In addition or alternatively thereto, there may be provided on the carrier section of the fitting element at least one second connecting element for connecting the fitting element to the operating element. The second connecting element is likewise preferably integral with the carrier section of the fitting element. The second connecting element may preferably likewise extend substantially perpendicularly to the carrier section of the fitting element.

In a preferred embodiment of the passenger service module, the housing accommodating the individual ventilation arrangement and/or the lighting arrangement is connected to the fitting element in the region of a first surface of the carrier section, so that the carrier section of the fitting element rests on the housing on a surface of the housing that faces the fitting element and is preferably formed by the cover plate of the housing. The individual air duct section of the fitting element, on the other hand, preferably extends from a second surface of the carrier section that is opposite the first surface of the carrier section.

The passenger service module may further comprise an electronics module connected to the fitting element. The electronics module may contain electronic components for controlling the individual ventilation arrangement, the lighting arrangement and/or the operating element. If desired, these components may be accommodated in a suitable housing. The electronics module is connected to the fitting element in particular in the region of the second surface of the carrier section that is opposite the first surface of the carrier section. This results in a configuration in which the carrier section of the fitting element is arranged between the housing accommodating the individual ventilation arrangement and/or the lighting arrangement and the electronics module. The electronics module, or a housing of the electronics module, may be provided with a cut-out in which the individual air duct section of the fitting element can be received. Alternatively, however, it is also conceivable to configure the electronics module in two parts and connect it to the fitting element on both sides of the individual air duct section in the region of the second surface of the carrier section.

The passenger service module preferably further comprises a receiver device of a contactless power supply system, which receiver device is connected electrically to the electronics module. The receiver device may be in the form of a coil, for example. A contactless power supply system allows current-carrying lines for connecting the electronics module to a higher-level power supply system to be omitted. As a result, the outlay in terms of fitting when installing the passenger service module in a vehicle, in particular in an aircraft, may be reduced further. The receiver device may be secured, for example, to the fitting element. In particular, it is conceivable to secure the receiver device to the fitting element of the passenger service module adjacent to the individual air duct section.

In a preferred embodiment, the passenger service module comprises a securing element which is configured to secure the fitting element in its fitted position in a vehicle, in particular in an aircraft. The securing element may be connected to the fitting element in particular in the region of a first end face of the carrier section.

The operating element of the passenger service module may comprise a touch panel holder which is connected to the touch panel and may preferably be connected to the fitting element in the region of a second end face of the carrier section that is opposite the first end face. The touch panel holder may comprise, for example, a frame which extends at least along a portion of the periphery of the touch panel at a distance from the touch panel. The touch panel holder may further comprise a holder section, which may be provided for connection to the second connecting element of the fitting element. The second connecting element is arranged in particular in the region of the second end face of the carrier section.

A passenger service system according to the invention, which may be provided in particular for installation in a vehicle or in an aircraft, comprises at least one above-described passenger service module. The passenger service system further comprises an interior fitment panel. The passenger service module and the interior fitment panel are so arranged relative to one another that the touch panel of the operating element of the passenger service module may be operated by way of a touch panel surface section of the interior fitment panel. In other words, in the passenger service system according to the invention, the touch panel of the operating element may be actuated by touching the touch panel surface section of the interior fitment panel.

In the interior fitment panel there may be provided at least one cut-out, in which the air nozzle of the individual ventilation arrangement or the housing accommodating the individual ventilation arrangement and/or the lighting arrangement of the passenger service module is received. Depending upon the size and shape of the interior fitment panel, the interior fitment panel may be provided to cooperate with a plurality of passenger service modules. The interior fitment panel is then configured with a corresponding number of cut-outs. Depending upon the configuration of the passenger service system, passive, that is to say non-functional, dummy modules may, however, also be arranged in the cut-outs formed in the interior fitment panel.

This is expedient, for example, when there is no passenger seat row in the region of an opening formed in the interior fitment panel.

The passenger service system preferably further comprises an individual air supply line, which is connected to the second end of the individual air duct section of the fitting element by way of the flexible individual air connecting line of the passenger service module. The individual air supply line may be part of a higher-level individual ventilation system.

The fitting element may be secured by way of the securing element to a channel for accommodating components of an emergency oxygen supply system. In the channel for accommodating components of an emergency oxygen supply system there may further be arranged a transmitter device of a contactless power supply system. The transmitter device may be in the form of a coil, for example, and may serve to supply electrical energy to the receiver device connected electrically to the electronics module. The positioning of the transmitter device in the channel for accommodating components of an emergency oxygen supply is advantageous in particular because the channel may be used without problems to lay electrical connecting lines of the transmitter device.

An above-described passenger service module and/or an above-described passenger service system may be used particularly advantageously in an aircraft. It is conceivable in particular to fit the passenger service module or the passenger service system beneath overhead luggage compartments in a passenger cabin of the aircraft. The touch panel of the operating element is then conveniently accessible to passengers seated in passenger seats arranged beneath the overhead luggage compartments.

SUMMARY OF FIGURES

A preferred embodiment of the invention will now be explained in greater detail with reference to the accompanying schematic drawings, in which.

DETAILED DESCRIPTION OF THE INVENTION

Figure 1:
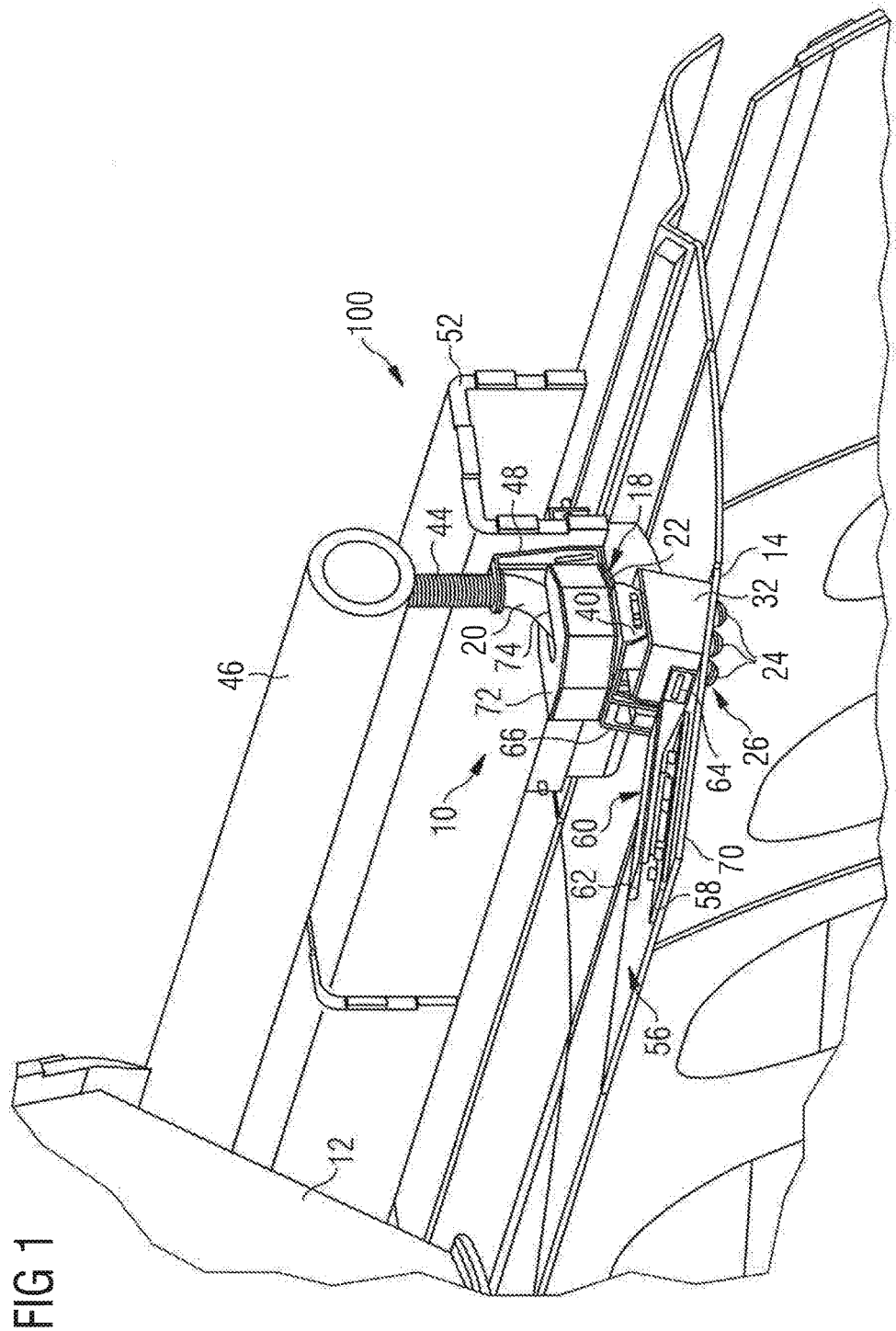
FIG. 1 shows a three-dimensional representation of a passenger service system.

In the figures, a passenger service system is designated generally 100 and a passenger service module is designated generally 10. As can best be seen in FIGS. 1 to 3, the passenger service system 10 is provided for fitting in an aircraft passenger cabin in a region beneath overhead luggage compartments 12 provided in the passenger cabin. The passenger service module 10 is then located in such a position that it can be reached comfortably by passengers seated in passenger seats beneath the overhead luggage compartments 12. In the exemplary embodiment of a passenger service system 100 shown in the figures, each passenger service module 10 is associated with a passenger seat row comprising three seats.

Figure 5:
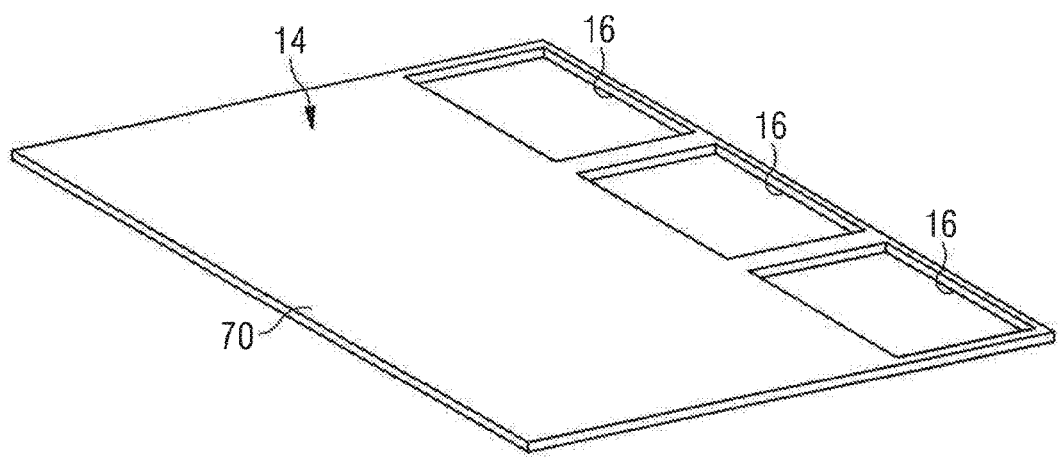
FIG. 5 shows a three-dimensional representation of an interior fitment panel of the passenger service system according to FIG. 1.

The passenger service system 100 comprises an interior fitment panel 14, which is provided for fitting in a passenger cabin region beneath the luggage compartments 12. As can be seen in FIG. 5 in particular, three cut-outs 16 are formed in the interior fitment panel 14. Each cut-out 16 is provided for cooperation with a passenger service module 10, the correlation between the interior fitment panel 14 and the passenger service modules 10 being explained in greater detail hereinbelow in connection with a discussion of the construction of the passenger service modules 10.

Figure 2:
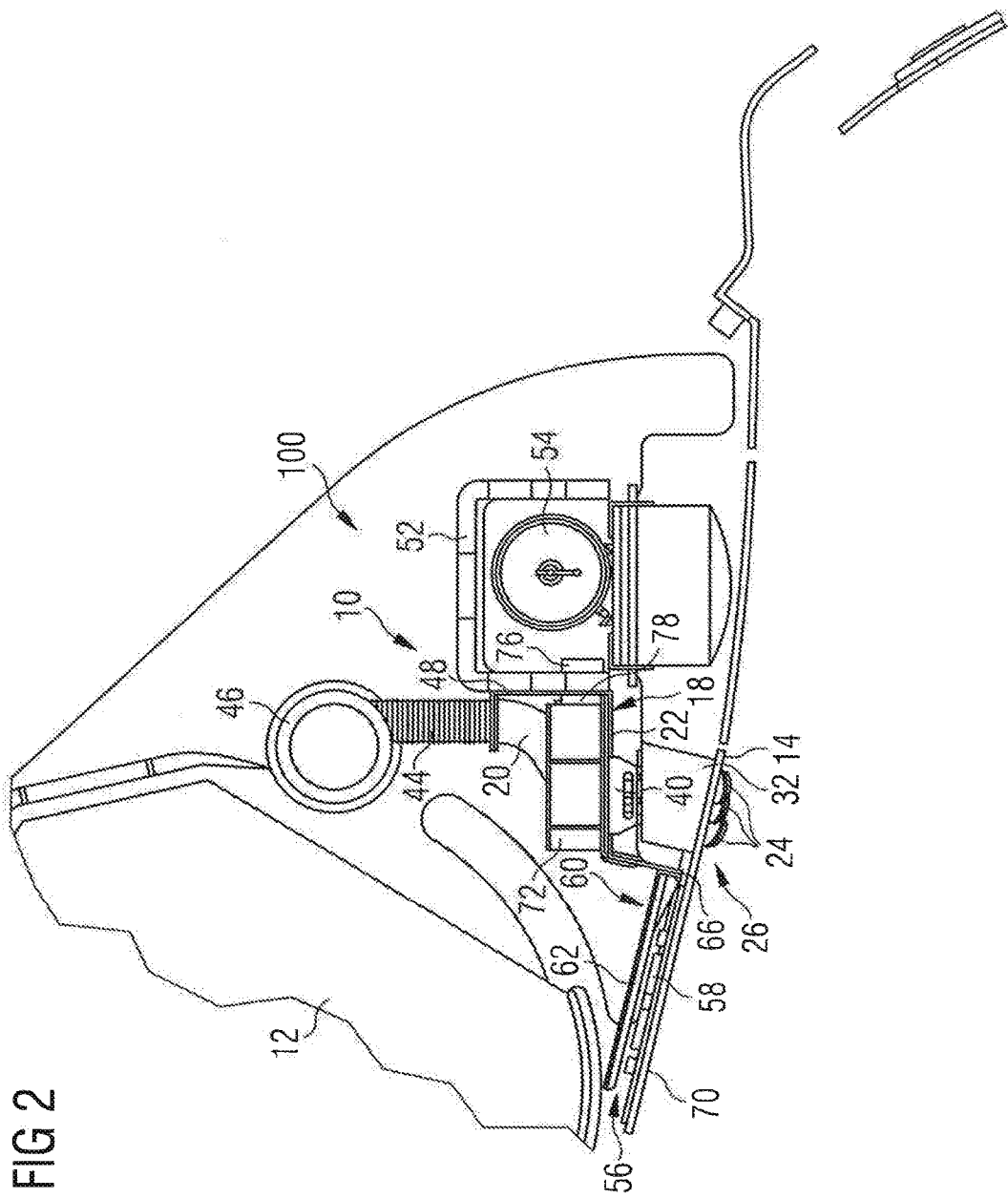
FIG. 2 shows a cross-sectional view of the passenger service system according to FIG. 1.
Figure 3:
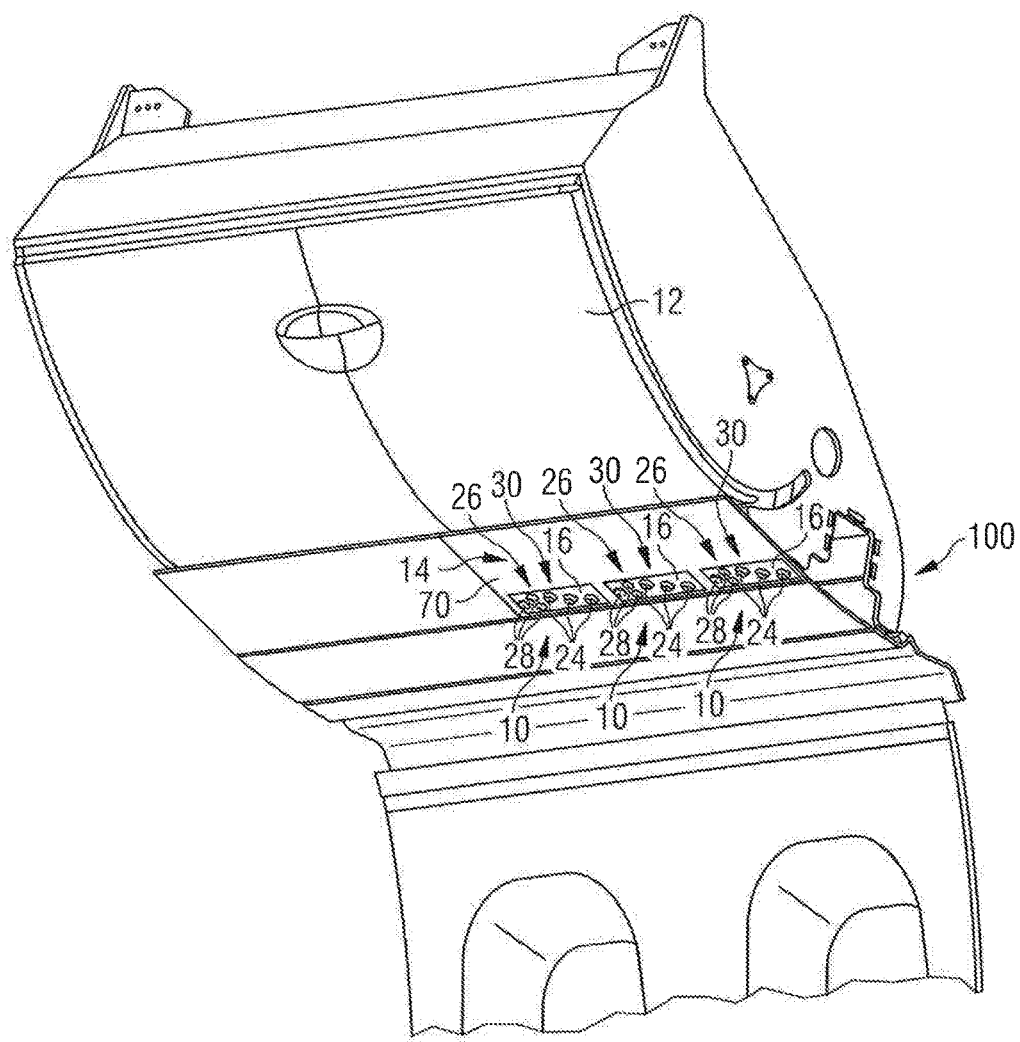
FIG. 3 shows a further three-dimensional view of the passenger service system according to FIG. 1, viewed from the interior of an aircraft passenger cabin.
Figure 4:
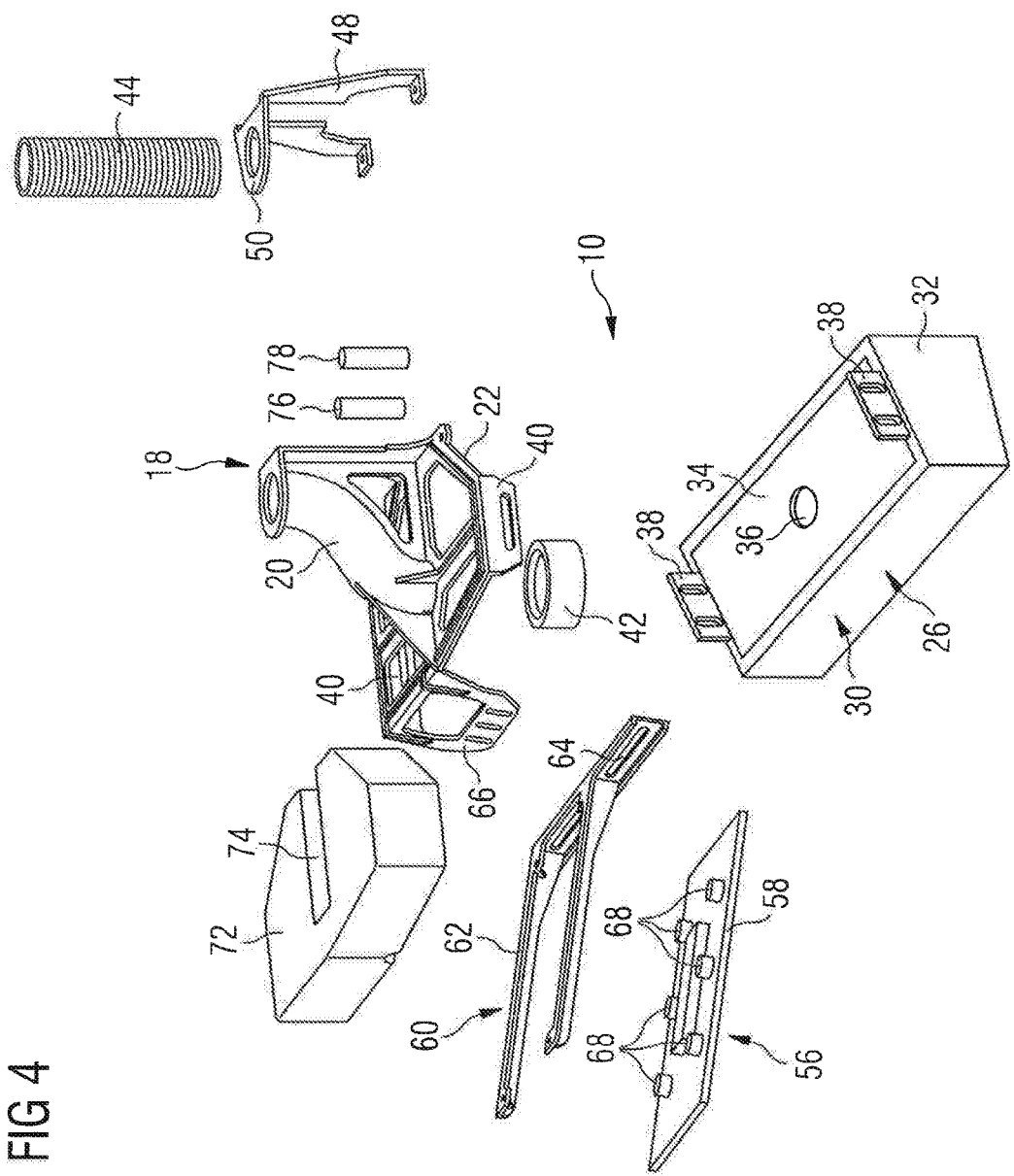
FIG. 4 shows an exploded view of a passenger service module of the passenger service system according to FIG. 1.

Each passenger service module 10 comprises a fitting element 18 which in turn comprises an individual air duct section 20 and a carrier section 22, see FIGS. 1, 2 and 4. The individual air duct section 20 and the carrier section 22 of the fitting element 18 are of integral construction. In particular, the individual air duct section 20 is in the form of a bent pipe section, whereas the carrier section 22 has a plate-like basic shape and is provided with appropriate cut-outs in order to reduce the weight of the fitting element 18.

The passenger service module 10 further comprises an individual ventilation arrangement 26 comprising three air nozzles 24, as well as a lighting arrangement 30 comprising three reading lamps 28. The individual ventilation arrangement 26 and the lighting arrangement 30 are arranged in a substantially trapezoidal housing 32. In particular, the shape of the housing 32 is matched to the shape and orientation of the interior fitment panel 14 in its fitted state in the aircraft passenger cabin. In the region of a surface which, in the fitted state of the passenger service module 10, faces the fitting element 18, the housing 32 is closed by a releasably secured cover plate 34. An opening 36 is formed in the cover plate 34. Furthermore, two holding elements 38, each provided with two oblong bores, extend from the surface of the housing 32 which, in the fitted state of the passenger service module 10, faces the fitting element 18.

The holding elements 38 serve to connect the housing 32, with the individual ventilation arrangement 26 arranged therein and the lighting arrangement 30 arranged therein, to the fitting element 18 by way of first connecting elements 40 provided on the carrier section 22 of the fitting element 18. The first connecting elements 40 extend substantially perpendicularly to the carrier section 22 from two mutually opposite side faces of the carrier section 22 and are each likewise provided with an oblong bore. Suitable securing means, such as, for example, screws or the like, can be guided through the oblong bores of the holding elements 38 and of the first connecting elements 40 and fixed by means of corresponding locking nuts in order to connect the housing 32 to the carrier section 22 of the fitting element 18. In particular, the housing 32 is connected to the fitting element 18 in the region of a first surface of the carrier section 32 which, in the fitted state of the passenger service module 10 in an aircraft passenger cabin, faces an interior of the aircraft passenger cabin. In other words, the housing 32 extends downwards from the fitting element 18 in the direction of the interior of the passenger cabin.

A first end, facing the housing 32, of the individual air duct section 20 of the fitting element 18 is connected by way of a flexible connecting element 42 to the opening 36 formed in the cover plate 34 of the housing 32. The flexible connecting element 42 accordingly produces an air-guiding connection between the individual air duct section 20 and the individual ventilation arrangement 26 arranged in the housing 32. Air passed through the individual air duct section 20 can accordingly be supplied to the individual ventilation arrangement 26 and finally can be blown out into the aircraft passenger cabin by way of the air nozzles 24 of the individual ventilation arrangement 26. The flexible configuration of the flexible connecting element 42 enables component and fitting tolerances to be compensated and vibrations that occur during operation of the passenger service module 10 to be absorbed.

A second end of the individual air duct section 20 of the fitting element 18, on the other hand, is connected to a first end of a flexible individual air connecting line 44. A second end of the individual air connecting line 44 is connected to an individual air supply line 46 of an individual ventilation system of the aircraft, see FIGS. 1 and 2. The individual air supply line 46 of the individual ventilation system extends through the aircraft passenger cabin substantially parallel to a longitudinal axis of the aircraft passenger cabin and supplies individual air to a plurality of passenger service modules 10 arranged one behind the other in the direction of the longitudinal axis of the aircraft passenger cabin. The flexible form of the individual air connecting line 44 again enables component and fitting tolerances to be compensated and vibrations that occur during operation of the passenger service module 10 and of the passenger service system 100 to be absorbed.

The passenger service module 10 further comprises a securing element 48 for securing the fitting element 18, and accordingly the passenger service module 10, in its fitted position. The securing element 48 is connected to the fitting element 18 in the region of a first end face of the carrier section 22 and comprises an abutment projection 50 provided for cooperation with the second end of the individual air duct section 20. In the abutment projection 50 there is formed an opening, through which the flexible individual air connecting line 44 passes. The securing element 48 secures the fitting element 18, and accordingly the passenger service module 10, to a side wall of a channel 52, associated with the passenger service system 100, for accommodating components 54 of an emergency oxygen supply system. Like the individual air supply line 46, the channel 52 for accommodating components 54 of an emergency oxygen supply system also extends through the aircraft passenger cabin substantially parallel to the longitudinal axis of the aircraft passenger cabin, so that a plurality of passenger service modules 10 arranged one behind the other parallel to the longitudinal axis of the aircraft passenger cabin can be secured without difficulty to the channel 52.

The passenger service module 10 is further equipped with an operating element 56, which in turn comprises a touch panel 58 and a touch panel holder 60. The touch panel holder 60 has a frame 62, which extends along at least a portion of the periphery of the touch panel 58 at a distance from the touch panel 58 and thereby protects the touch panel 58 from damage and other influences. The touch panel holder 60 further has a holding section 64, which is provided with two oblong bores. The holding section 64 is provided to cooperate with a second connecting element 66 which extends from the carrier section 22 substantially perpendicularly to the carrier section 22 in the region of a second end face of the carrier section 22. The second connecting element 66 is provided with three oblong bores, so that corresponding securing means, such as, for example, screws, can be guided through the oblong bores in the holding section 64 of the touch panel holder 60 and the second connecting element 66 and fixed by means of locking nuts, in order to secure the touch panel holder 60, and accordingly the touch panel 58, to the fitting element 18. The holding section 64 of the touch panel holder 60 can further be used additionally to connect the touch panel holder 60 to the housing 32 accommodating the individual ventilation arrangement 26 and the lighting arrangement 30.

The touch panel 58 comprises a plurality of input fields 68, by way of which the operation of the air nozzles 24 of the individual ventilation arrangement 26 and the operation of the reading lamps 28 of the lighting arrangement 30 can be individually controlled. There is additionally provided on the touch panel 58 an input field 68 that is associated with the function "call flight attendant". When the passenger service system 100 is in the fitted state in an aircraft passenger cabin, the passenger service module 10 and the interior fitment panel 14 are so arranged relative to one another that the touch panel 58 of the operating element 56 of the passenger service module 10 can be operated by way of a touch panel surface section 70 of the interior fitment panel 14, see FIGS. 1 and 2. In other words, by touching the touch panel surface section 70 of the interior fitment panel 14 in the region of the input fields 68 of the touch panel 58, passengers seated in seats beneath the passenger service module 10 are able to operate the touch panel 58 and thereby control the operation of the air nozzles 24 and reading lamps 28 associated with their seats. In order to allow individual air to flow unimpeded from the air nozzles 24 into the interior of the passenger cabin, the housing 32 of each passenger service module 10 accommodating the individual ventilation arrangement 26 and the lighting arrangement 30 is arranged in a cut-out 16 provided in the interior fitment panel 14.

Finally, the passenger service module 10 comprises an electronics module 72. Electronic components for controlling the individual ventilation arrangement 26, the lighting arrangement 30 and the operating element 56 are combined in the electronics module 72. The electronics module 72 is connected to the fitting element 18 in the region of a second surface of the carrier section 22, giving a configuration in which the carrier section 22 of the fitting element 18 is arranged between the electronics module 72 and the housing 32 accommodating the individual ventilation arrangement 26 and the lighting arrangement 30. The electronics module 72 has a cut-out 74, the shape of which is matched to the shape of the individual air duct section 20 of the fitting element 18, so that the securing of the electronics module 72 to the carrier section 22 of the fitting element 18 is not hindered by the individual air duct section 20 of the fitting element 18.

The electronics module 72 is supplied with electrical energy by means of a contactless power supply system. The contactless power supply system comprises a transmitter device 76 in the form of a coil, which is arranged in the channel 52 for accommodating components 54 of an emergency oxygen supply system. The transmitter device 76 is connected to a central power supply network of the aircraft by way of current-carrying lines laid in the channel 52. The contactless power supply system further comprises a receiver device 78, which is likewise in the form of a coil and is secured to the fitting element 18 of the passenger service module 10 adjacent to the electronics module 72. The receiver device 78 is connected to the electronics module 72, that is to say to the electronic components of the electronics module 72, by means of cables.

The invention claimed is:

1. A passenger service module comprising:
 a fitting element,
 an individual ventilation arrangement connected to the fitting element and comprising a plurality of air nozzle, a lighting arrangement connected to the fitting element and comprising at least one reading lamp, and an operating element connected to the fitting element, the operating element comprising a touch panel having at least one input field for individually controlling the operation of at least one of the air nozzle and the reading lamp, wherein the fitting element comprises an individual air duct section configured to supply air to the at least one air nozzle, and a carrier section configured to connect the fitting element to at least one of the individual ventilation arrangement, the lighting arrangement and the operating element, and wherein a first end of the individual air duct section of the fitting element is connectable to a first end of a flexible individual air connecting line and a second end of the flexible individual air connecting line is connectable to the individual air supply line, wherein the flexible individual connecting line is formed by a flexible hose, and wherein a length of the individual air duct section is greater than a width of the individual air duct section, wherein the length is along a direction of the air flow through the individual air duct section.

2. The passenger service module according to claim 1, wherein at least one of the individual ventilation arrangement and the lighting arrangement is arranged in a housing connected to the fitting element, the housing comprising a cover plate which closes the housing in a region of a surface of the housing facing the fitting element.

3. The passenger service module according to claim 2, wherein a second end of the individual air duct section of the fitting element is connected to the individual ventilation arrangement by a flexible connecting element, the flexible connecting element connecting the second end of the individual air duct section of the fitting element to an opening formed in the cover plate of the housing accommodating at least one of the individual ventilation arrangement and the lighting arrangement.

4. The passenger service module according to claim 2, further comprising at least one second connecting element configured to connect the fitting element to at least one of the operating element, the housing accommodating the individual ventilation arrangement, and the lighting arrangement connected to the fitting element on a first side of the carrier section.

5. The passenger service module according to claim 1, further comprising an electronics module connected to the fitting element and including electronic components configured to control at least one of the individual ventilation arrangement, the lighting arrangement and the operating element, the electronics module being connected to the fitting element on a second side of the carrier section opposite to a first side of the fitting element.

6. The passenger service module according to claim 5, further comprising a receiver device of a contactless power supply system, wherein the receiver device is electrically connected to the electronics module and is secured to the fitting element.

7. The passenger service module according to claim 1, further comprising a securing element which is configured for securing the fitting element in a fitted position, the securing element being connected to the fitting element proximate to a first end of the carrier section.

8. The passenger service module according to claim 1, wherein the operating element comprises a touch panel holder which is connected to the fitting element in the region of a second end face of the carrier section that is opposite the first end face.

9. A passenger service system comprising:
the passenger service module according to claim 1, and
an interior fitment panel, the passenger service module and the interior fitment panel being so arranged relative to one another that the touch panel of the operating element of the passenger service module is operable by way of a touch panel surface section of the interior fitment panel.

10. The passenger service system according to claim 9, wherein there is formed in the interior fitment panel at least one cut-out in which the air nozzle of the individual ventilation arrangement or the housing of the passenger service module accommodating at least one of the individual ventilation arrangement and the lighting arrangement is arranged.

11. The passenger service system according to claim 9, further comprising an individual air supply line which is connected by way of the flexible individual air connecting line of the passenger service module to the second end of the individual air duct section of the fitting element.

12. The passenger service system according to claim 8, wherein the fitting element is secured by way of the securing element to a channel configured to accommodate components of an emergency oxygen supply system.

13. An aircraft comprising the passenger service module according to claim 1.

14. The passenger service module according to claim 1, wherein the individual air supply line extends through the aircraft passenger cabin substantially parallel to a longitudinal axis of the aircraft passenger cabin.

15. The passenger service module according to claim 1, wherein the individual air supply line supplies individual air to a plurality of passenger service modules arranged one behind another in a direction of a longitudinal axis of the aircraft passenger cabin.

16. The passenger service module according to claim 1, the flexible individual air connecting line is disposed between the individual air duct section and the individual air supply line.

* * * * *